US011223177B2

(12) United States Patent
Mabuchi

(10) Patent No.: US 11,223,177 B2
(45) Date of Patent: Jan. 11, 2022

(54) TERMINAL CRIMPING DEVICE

(71) Applicant: Yazaki Corporation, Tokyo (JP)

(72) Inventor: Miyoshi Mabuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/771,455

(22) PCT Filed: Nov. 15, 2018

(86) PCT No.: PCT/JP2018/042319
§ 371 (c)(1),
(2) Date: Jun. 10, 2020

(87) PCT Pub. No.: WO2019/138687
PCT Pub. Date: Jul. 18, 2019

(65) Prior Publication Data

US 2020/0366042 A1 Nov. 19, 2020

(30) Foreign Application Priority Data

Jan. 15, 2018 (JP) ............................ JP2018-004333

(51) Int. Cl.
*B23P 19/00* (2006.01)
*H01R 43/048* (2006.01)

(52) U.S. Cl.
CPC ...... *H01R 43/048* (2013.01); *Y10T 29/53226* (2015.01); *Y10T 29/53235* (2015.01)

(58) Field of Classification Search
CPC ...... H01R 43/048; H01R 43/052; H01R 4/18; H01R 43/05; H01R 43/058; H01R 4/20; Y10T 29/53235; Y10T 29/5193; Y10T 29/49181; Y10T 29/49185; Y10T 29/53217; Y10T 29/53226; Y10T 29/5327; Y10T 29/49174; Y10T 29/53209
USPC ......... 29/753, 861, 729, 747, 749, 751, 757, 29/760, 761, 854, 857, 874
See application file for complete search history.

(56) References Cited

U.S. PATENT DOCUMENTS

| | | | | |
|---|---|---|---|---|
| 6,244,901 B1 * | 6/2001 | Fujii | H01R 4/185 439/595 |
| 6,517,392 B2 * | 2/2003 | Murakami | H01R 43/048 439/877 |

FOREIGN PATENT DOCUMENTS

| | | | |
|---|---|---|---|
| CN | 105210244 A | 12/2015 |
| JP | 2010-003429 A | 1/2010 |

(Continued)

*Primary Examiner* — Thiem D Phan
(74) *Attorney, Agent, or Firm* — Sughrue Mion, PLLC

(57) ABSTRACT

The purpose of the present invention is to provide a terminal crimping device and a terminal crimping method which provide improved machining quality. A terminal crimping device is configured to crimp-connect, to an electric wire, each of a pair of adjacent terminals of a plurality of terminals coupled to each other by a carrier, the carrier having a terminal connection section connected to each terminal and a coupling section coupling adjacent terminal connection sections, the terminal crimping device including a carrier cutting unit configured to cut the coupling section, a terminal positioning unit configured to position one terminal of the pair of terminals such that the one terminal is located close to another terminal of the pair of terminals, and crimp dies configured as a pair to crimp-connect each terminal to the electric wire.

1 Claim, 13 Drawing Sheets

(56) References Cited

FOREIGN PATENT DOCUMENTS

| | | | |
|---|---|---|---|
| JP | 2010003429 | * | 1/2010 |
| JP | 2012238437 | * | 12/2012 |

* cited by examiner

TERMINAL CRIMPING DEVICE

TECHNICAL FIELD

The present invention relates to a terminal crimping device and a terminal crimping method.

BACKGROUND

Patent Document 1 discloses a terminal crimping method for a multi-conductor wire. This method uses a batch pitch alignment tool having a plurality of parallely-arranged core wire insertion portions to crimp respective terminals onto the respective core wires of the multi-conductor wire at once, with the respective core wires being inserted to and held at the respective core wire insertion portions. At this time, a link belt coupling the respective terminals is pressed and bent at a location between the respective terminals by a pressing member to match an inter-terminal pitch with a pitch between terminal pressing surfaces, and in this state, the respective terminals are crimped onto the respective core wires at once.

PRIOR ART DOCUMENT

Patent Document

Patent Document 1: JP 2010-003429 A

SUMMARY OF THE INVENTION

Problem to be Solved

However, in the conventional terminal crimping method for the multi-conductor wire disclosed in Patent Document 1, since the link belt coupling the respective terminals is pressed and bent, a portion which has been pressed and bent is elastically deformed, making the posture of the terminal during crimping unstable. As a result, there is often variation in crimp position at which each terminal is crimped onto the electric wire.

An object of the present invention is to provide a terminal crimping device and a terminal crimping method which provide improved machining quality.

Solution to Problem

In order to achieve the above-described object, the present invention provides, in a first aspect, a terminal crimping device configured to crimp-connect, to an electric wire, each of a pair of adjacent terminals of a plurality of terminals coupled to each other by a carrier, the carrier having a terminal connection section connected to each of the terminals and a coupling section coupling adjacent terminal connection sections, the terminal crimping device including: a carrier cutting unit configured to cut the coupling section, a terminal positioning unit configured to position one terminal of the pair of terminals such that the one terminal is located close to another terminal of the pair of terminals, and crimp dies configured as a pair to crimp-connect each of the terminals to the electric wire.

Further, the present invention provides, in a second aspect, the terminal crimping device as described in the first aspect, wherein the terminal positioning unit includes a terminal feed unit configured to feed the carrier from the one towards the another, the carrier cutting unit includes a support unit that supports the carrier in a manner capable of moving the carrier from the one towards the another, and a pair of blades arranged side by side at the support unit along a direction from the one towards the another and configured to cut the coupling section to cut out at least a part of the coupling section.

Further, the present invention provides, in a third aspect, a terminal crimping method for crimp-connecting, to an electric wire, each of a pair of adjacent terminals of a plurality of terminals coupled to each other by a carrier, the carrier having a terminal connection section connected to each of the terminals and a coupling section coupling adjacent terminal connection sections, the method including: a carrier cutting step of cutting the coupling section located between the pair of terminals and coupling the pair of terminals, a terminal positioning step of positioning one terminal of the pair of terminals that has been separated by cutting in the carrier cutting step, such that the one terminal is located close to another terminal of the pair of terminals, and a terminal crimping step of crimp-connecting, to the electric wire, each of the terminals that has been positioned in the terminal positioning step.

Advantageous Effect of the Invention

The invention according to the first aspect includes the carrier cutting unit configured to cut the coupling section, the terminal positioning unit configured to position one terminal of the pair of terminals such that the one terminal is located close to another terminal of the pair of terminals, and crimp dies configured as a pair to crimp-connect each of the terminals to the electric wire. Thus, the another terminal of the pair of terminals is separated from the one terminal of the pair of terminals by cutting the coupling section, so they can be arranged close to each other by the terminal positioning unit, thereby stabilizing the posture of the terminals during crimping. Consequently, the machining quality can be improved.

The invention according to the third aspect includes the carrier cutting step of cutting the coupling section located between the pair of terminals and coupling the pair of terminals, the terminal positioning step of positioning one terminal of the pair of terminals that has been separated by cutting in the carrier cutting step, such that the one terminal is located close to the another terminal of the pair of terminals, and the terminal crimping step of crimp-connecting, to the electric wire, each terminal that has been positioned in the terminal positioning step. By cutting the coupling section as described above, the another terminal of the pair of terminals is separated from the one terminal of the pair of terminals, so they can be arranged close to each other in the terminal positioning step, thereby stabilizing the posture of the terminals during crimping. Consequently, the machining quality can be improved.

DETAILED DESCRIPTION OF THE EXEMPLARY EMBODIMENTS

Figure 1:
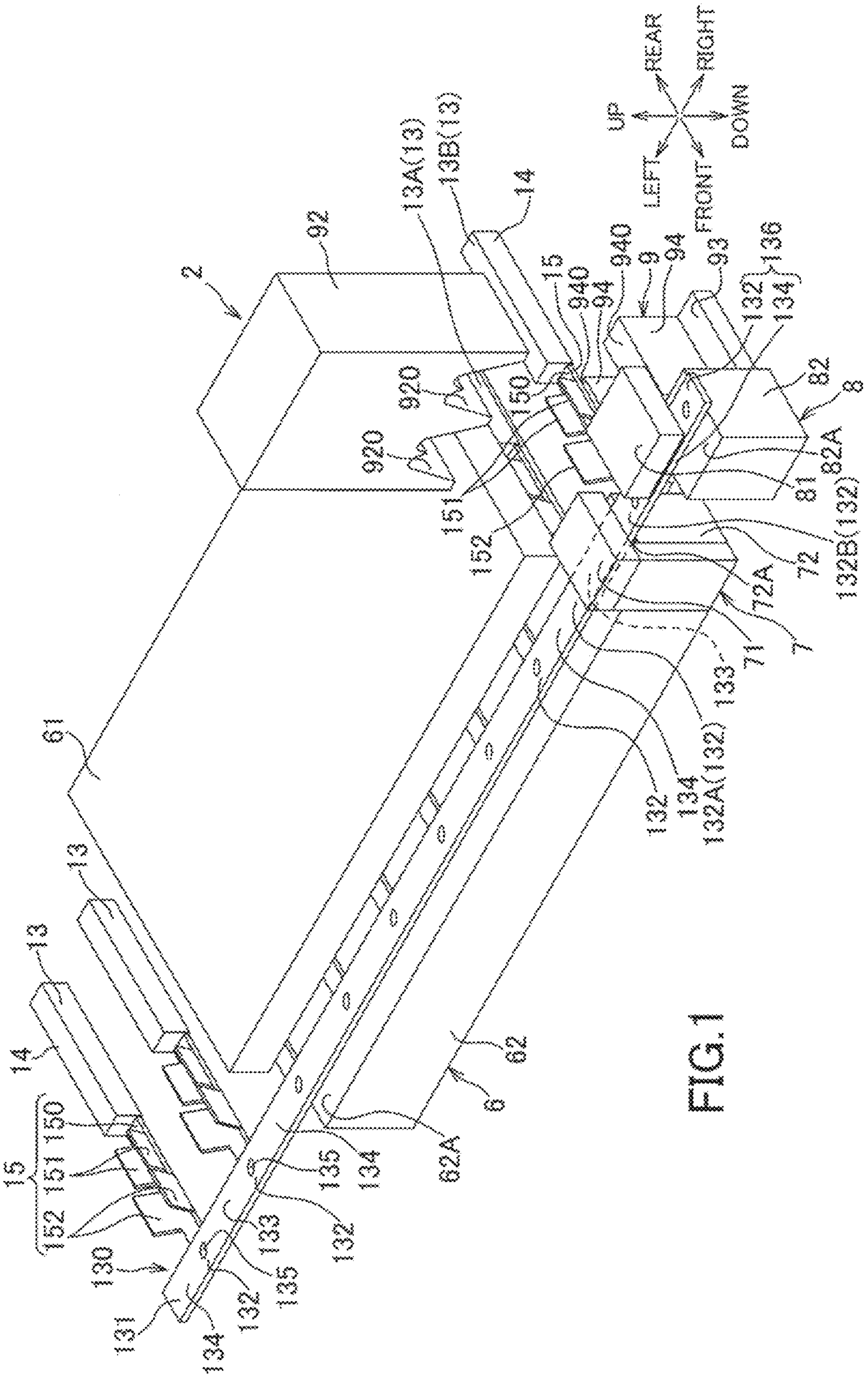
FIG. 1 is a perspective view of a terminal crimping device according to one embodiment of the present invention.

The following will explain an embodiment of the present invention with reference to the drawings. FIG. 1 is a perspective view of a terminal crimping device according to one embodiment of the present invention. FIG. 12D is a plan view showing a multi-conductor cable 10.

<Multi-Conductor Cable>

As shown in FIG. 12D, the multi-conductor cable 10 includes a pair of covered electric wires 11 (hereinafter called the electric wires 11), an insulation sheath 12 covering, in a lump, front sides of these electric wires 11 so as to expose rear ends of the pair of electric wires 11, and a pair of terminals 13, 13 configured to be crimp-connected to the rear ends of the respective electric wires 11. In this embodiment, of the plurality of terminals 13, the terminal located at a right end is indicated with a reference sign 13B, and the terminal adjacent to and on the left side of the terminal 13B is indicated with a reference sign 13A. Each terminal 13A, 13B constitutes the pair of terminals 13A (13), 13B (13) which forms a part of the multi-conductor cable 10.

Herein, the pair of terminals 13A, 13B is obtained by cutting out a carrier 131 of a transverse link terminal 130. The transverse link terminal 130 is an one-sided link terminal that is wound around a terminal reel not shown, and the plurality of terminals 13 is connected by the carrier 131.

Figure 12A:
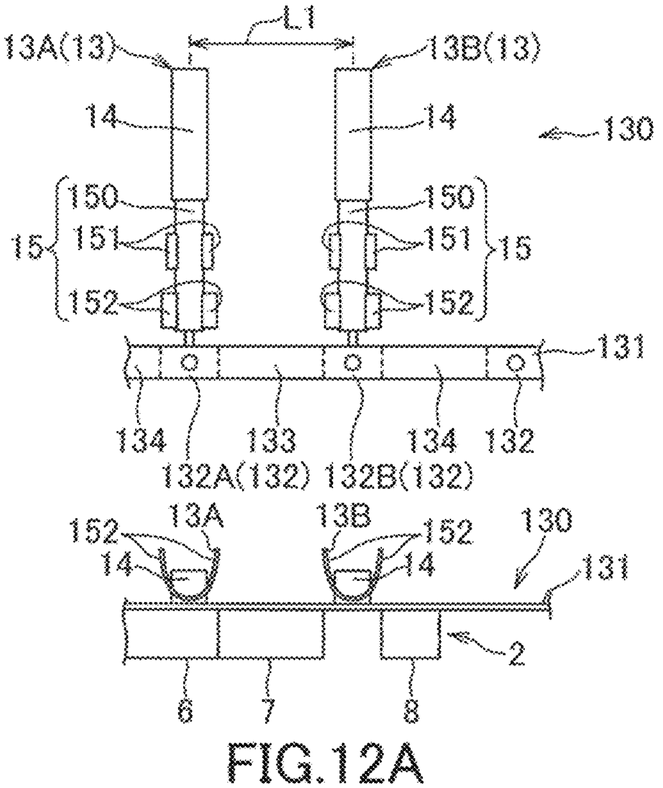
FIG. 12A is a diagram schematically illustrating a procedure for producing a multi-conductor cable.

As shown in FIG. 12A, the carrier 131 is formed into a band plate-like shape and includes terminal connection sections 132A (132), 132B (132) that are continuous with respective front sides of the respective terminals 13A, 13B, a first coupling section 133 (coupling section) coupling the adjacent terminal connection sections 132A, 132B to each other, and a second coupling section 134 that is continuous with a side of each terminal connection section 132A, 132B located away from the first coupling section 133.

The terminal connection section 132 is provided with a terminal feed hole 135. In the following, the carrier 131 side of each terminal 13 is referred to as "front", and an opposite side is referred to as "rear". In addition, an arrangement direction of the plurality of terminals 13, 13 is referred to as a right-left direction, and, when looking at the drawing, left side is referred to as "left side", right side is referred to as "right side", upper side is referred to as "upper side" and lower side is referred to as "lower side".

In this embodiment, the first coupling section 133 located between the pair of terminals 13A, 13B will be cut by a later-described carrier cutting unit 7 (carrier cutting means). By cutting the first coupling section 133, the terminal 13B is separated from the terminal 13A, but in the state shown in FIG. 1, the terminal 13B is continuous with the terminal connection section 132B, the second coupling section 134 continuous with the right side of the terminal connection section 132, and the terminal connection section 132 continuous with the right side of the second coupling section 134.

As shown in FIG. 12A, each terminal 13 includes a tubular electrical contact section 14 to which a mating terminal (not shown) is to be inserted and connected, and an electric wire connection section 15 which is formed continuous with the electrical contact section 14 and to which the electric wire 11 is to be mechanically and electrically connected. In this embodiment, although the terminal 13 is exemplary described as the female terminal 13 having the tubular electrical contact section 14 to which the mating terminal is to be inserted and connected, the terminal 13 may be a male terminal having a tab-like electrical contact section.

As shown in FIG. 12A, the electric wire connection section 15 includes a rectangular plate-shaped base section 150, a pair of conductor fasten pieces 151, 151 to be swaged and fastened onto a conductor section 111 exposed by removing a cover of the electric wire 11, and a pair of cover fasten pieces 152, 152 to be swaged and fastened onto the cover 110 of the electric wire 11.

<Terminal Crimping Device>

As shown in FIG. 1, a terminal crimping device 1 includes an applicator 2, a drive unit not shown for moving up and down a ram not shown of the applicator 2, and a control unit not shown for controlling the drive unit.

As shown in FIG. 1, the applicator 2 includes a terminal feed unit (terminal feed means) having a terminal feed claw not shown, a terminal guide 6 for horizontally guiding the transverse link terminal 130 from the terminal reel to an anvil 94, a carrier cutting unit 7 (carrier cutting means) for cutting the first coupling section 133 of the transverse link terminal 130, a carrier transport chuck 8, a crimp mechanism 9 for crimp-connecting each terminal 13 to each electric wire 11, and a terminal cutting unit not shown for separating, by cutting, each terminal 13A, 13B from each terminal connection section 132A, 132B.

The terminal feed unit is configured to make the terminal feed claw enter into the terminal feed hole 135 provided on the carrier 131 to feed the carrier 131 to the right (from one side to the other side) at a predetermined timing for a predetermined distance.

Figure 12B:
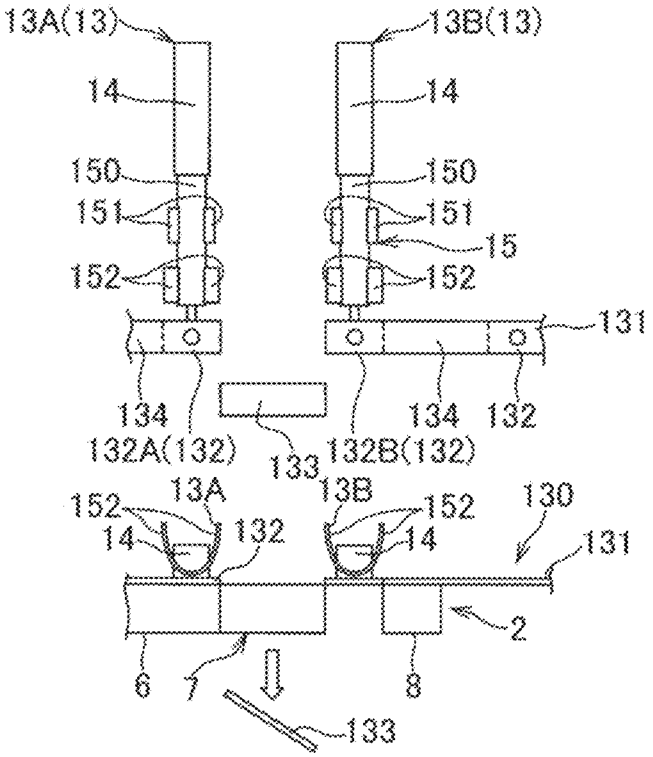
FIG. 12B is a diagram showing an operation state after FIG. 12A.

As shown in FIG. 12B, such terminal feed unit makes the terminal feed claw enter into the terminal feed hole 135 provided on the carrier 131 after the first coupling section 133 located between the pair of terminals 13A, 13B has been cut by the carrier cutting unit 7 (carrier cutting means), and sequentially changes the terminal feed hole 135 to which the terminal feed claw is to be entered, thereby feeding the carrier 131 to the right for a predetermined distance. Here, the terminal feed claw is entered into the terminal feed hole 135 that is continuous with the terminal 13A to feed the carrier 131 that is continuous with the terminal 13A to the right. By feeding the carrier 131 to the right, the distance between the terminals 13A, 13B becomes a predetermined dimension L2 (shown in FIG. 6) that is smaller than a dimension L1 (shown in FIG. 6) between the terminals 13A, 13B having the first coupling section 133 that is not cut. The predetermined dimension L2 is a distance between the terminals 13A, 13B when they are subjected to the swaging for connection by the anvils 94 and a crimper 92 in a later-described crimp mechanism 9, and is a distance between the terminals 13A, 13B of the completed multi-conductor cable 10.

In this embodiment, a configuration for moving the terminal 13A (the one) of the pair of terminals 13A, 13B closer to the terminal 13B (the another) of the pair of terminals 13A, 13B to make the distance between the pair of terminals 13A, 13B to be the predetermined dimension L2, is referred to as "terminal positioning means". The terminal positioning means includes the terminal feed unit (terminal feed means).

As shown in FIG. 1, the terminal guide 6 includes a pair of guide plates 61, 62 formed into a rectangular plate-like shape and arranged opposedly in the up-down direction. Of the pair of guide plates 61, 62, the guide plate located on the upper side is referred to as an upper guide plate and indicated with a reference sign 61, and the guide plate located on the lower side is referred to as a lower guide plate and indicated with a reference sign 62. An upper face 62A of the lower guide plate 62 includes a flat face that is orthogonal to the up-down direction.

The pair of guide plates 61, 62 is arranged such that a long side direction thereof is arranged along the right-left direction, and a short side direction thereof is arranged in the front-rear direction. The transverse link terminal 130 is arranged between the pair of guide plates 61, 62 in an orientation in which the carrier 131 is arranged on the front side and the respective terminals 13 are arranged on the rear side, such that an extending direction of the carrier 131 corresponds to the long side direction and an longitudinal direction of the respective terminals 13 (i.e., a direction orthogonal to the extending direction) corresponds to the short side direction. The transverse link terminal 130 is arranged movable in the right-left direction between the pair of guide plates 61, 62. By using the terminal guide 6 as described above, the transverse link terminal 130 is horizontally guided from the terminal reel to where the anvil 94 is located.

Figure 2:
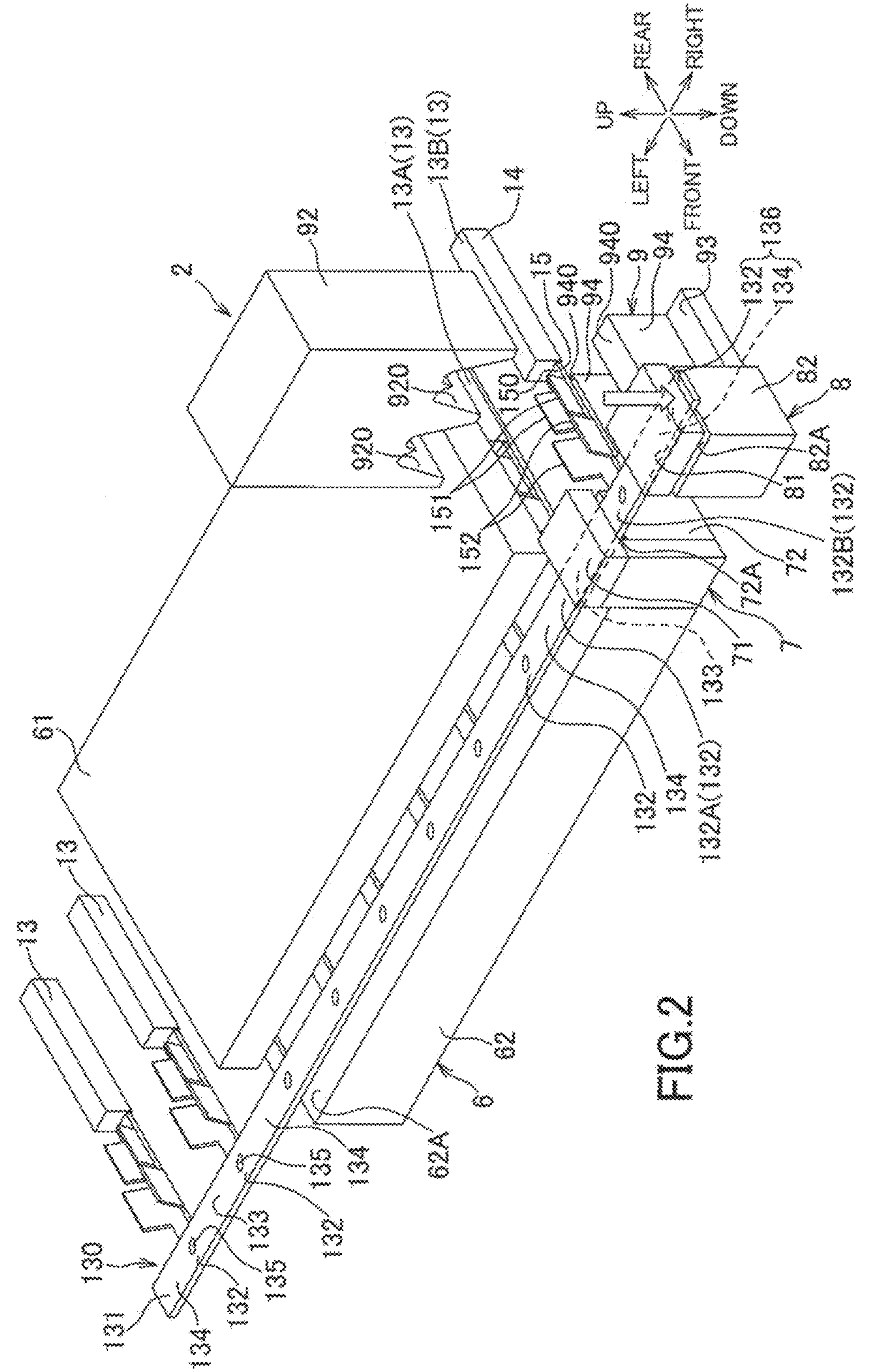
FIG. 2 is a perspective view of the terminal crimping device illustrating an operation state after FIG. 1.
Figure 3:
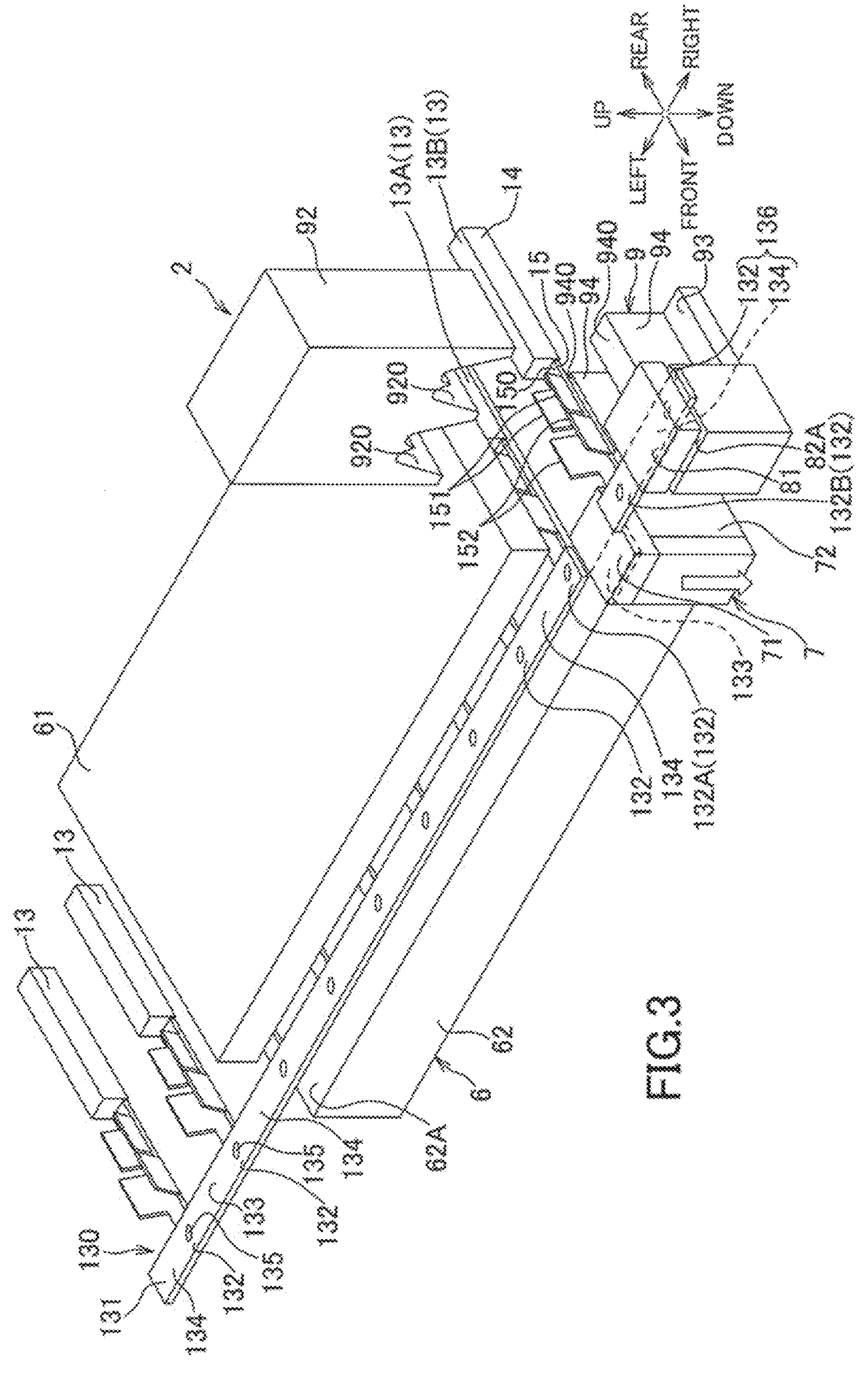
FIG. 3 is a perspective view of the terminal crimping device illustrating an operation state after FIG. 2.

As shown in FIG. 1 to FIG. 3, the carrier cutting unit 7 is provided at a location adjacent to the terminal feed unit in the direction in which the carrier 131 is fed. This carrier cutting unit 7 is provided in a manner movable to a first cut position (shown in FIG. 2) and to a second cut position (shown in FIG. 3) located below the first cut position. By moving the carrier cutting unit 7 from the first cut position to the second cut position, the first coupling section 133 of the carrier 131 can be cut out.

The carrier cutting unit 7 includes a pair of opposing walls 71, 72 formed into a cuboid-like shape and arranged opposedly in the up-down direction, and a pair of blades (not shown) supported on a support body not shown and configured to be moved downward to cut the first coupling section 133 of the carrier 131. That is, the pair of blades are supported on the pair of opposing walls 71, 72 via the support body.

In the following, of the pair of opposing walls 71, 72, the opposing wall located on the upper side is referred to as an upper opposing wall and indicated with a reference sign 71, and the opposing wall located on the lower side is referred to as a lower opposing wall and indicated with a reference sign 72. An upper face 72A of the lower opposing wall 72 includes a flat face that is orthogonal to the up-down direction. The upper face 72A of the lower opposing wall 72 is arranged on the same plane as the upper face 62A of the lower guide plate 62 of the terminal guide 6.

The pair of blades is supported on both sides in the right-left direction of the pair of opposing walls 71, 72 and arranged opposedly in the right-left direction. The dimension of the pair of blades in the opposed direction is arranged substantially equal to the dimension of the carrier 131 in the first coupling section 133 in the extending direction. As shown in FIG. 3, the carrier cutting unit 7 as described above is moved from the first cut position to the second cut position, thereby moving the pair of blades downward together with the pair of opposing walls 71, 72 to cut the first coupling section 133 of the carrier 131. By doing so, a boundary locations between the first coupling section 133 and the adjacent terminal connection sections 132A, 132B are cut and the first coupling section 133 is cut out.

Figure 4:
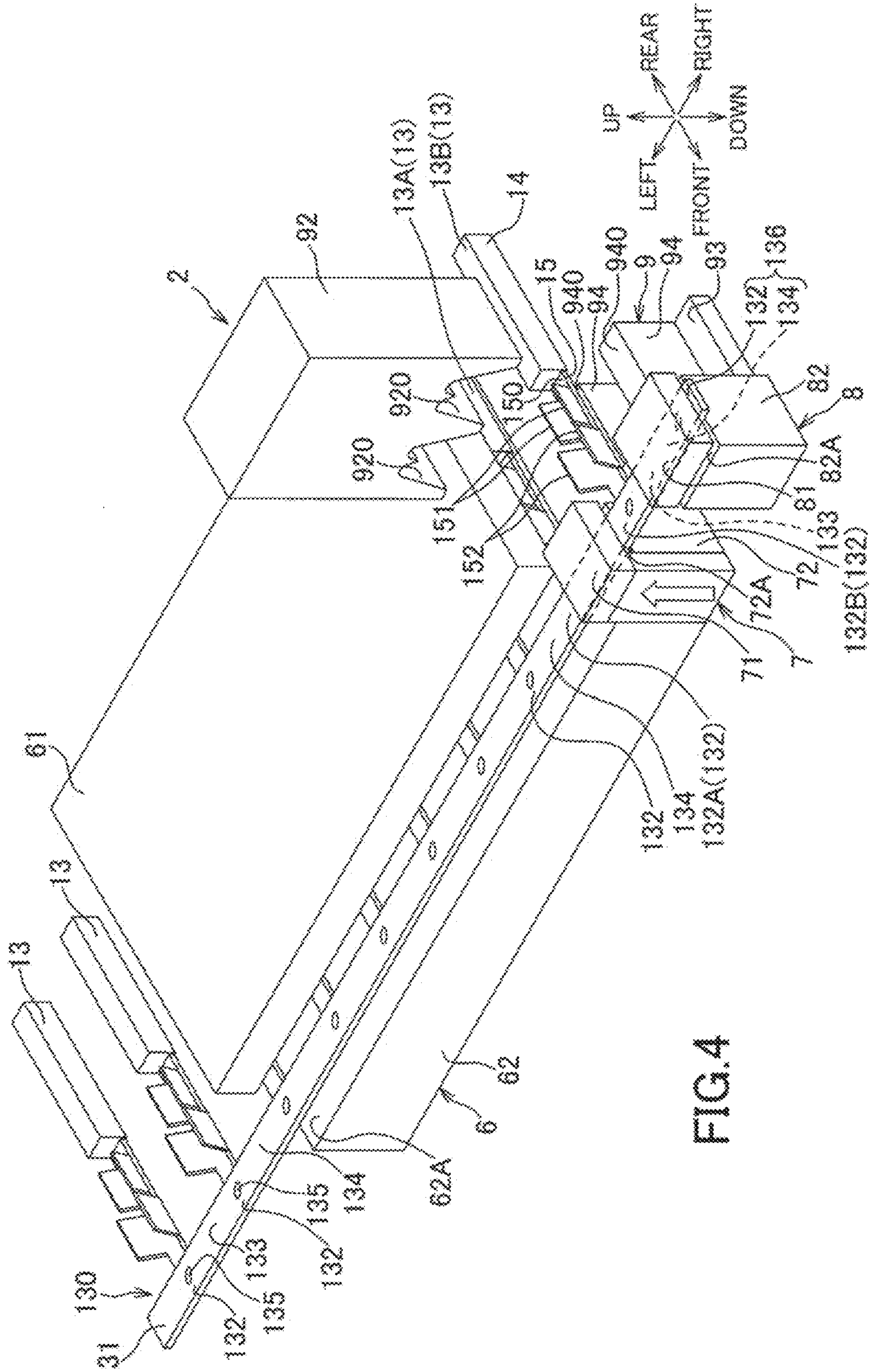
FIG. 4 is a perspective view of the terminal crimping device illustrating an operation state after FIG. 3.

Then, as shown in FIG. 4, the carrier cutting unit 7 is returned from the second cut position to the first cut position. At this point, the upper face 62A of the lower guide plate 62 of the terminal guide 6 and the upper face 72A of the lower opposing wall 72 are positioned on the same plane.

Figure 5:
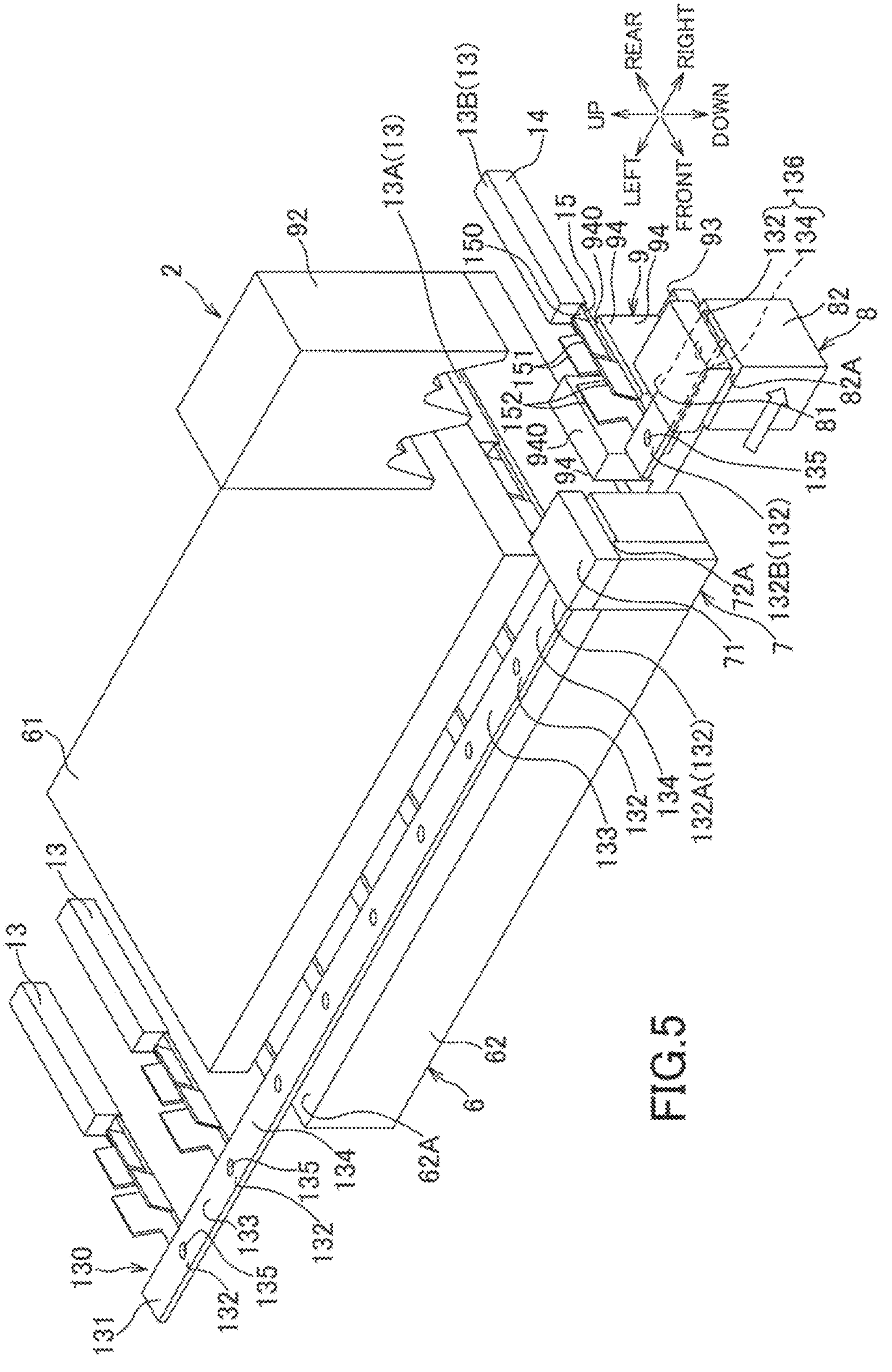
FIG. 5 is a perspective view of the terminal crimping device illustrating an operation state after FIG. 4.

As shown in FIG. 4 and FIG. 5, the carrier transport chuck 8 is provided on the side (i.e., the right side) of the carrier cutting unit 7 in the direction in which the carrier 131 is fed, and is arranged capable of chucking the second coupling section 134 and the terminal connection section 132 located on the feeding direction side (i.e., the right side) of the terminal connection section 132B of the carrier 131. That is, the carrier transport chuck 8 is arranged movable, with respect to the carrier cutting unit 7, to a first transport position (shown in FIG. 4) which is spaced from the carrier cutting unit 7 for the dimension of the terminal connection section 132B of the carrier 131 in the feeding direction (i.e., the right-left direction), to a second transport position (shown in FIG. 5) located to the right with respect to the first transport position.

The carrier transport chuck 8 is formed into a cuboid-like shape and includes a pair of chuck units 81, 82 arranged opposedly in the up-down direction. In the following, of the pair of chuck units 81, 82, the chuck unit located on the upper side is referred to as an upper chuck unit and indicated with a reference sign 81, and the chuck unit located on the lower side is referred to as a lower chuck unit and indicated with a reference sign 82. An upper face 82A of the lower chuck unit 82 includes a flat face that is orthogonal to the up-down direction. The upper face 82A of the lower chuck unit 82 is arranged on the same plane as the upper face 72A of the lower opposing wall 72 of the carrier cutting unit 7.

After the first coupling section 133 has been cut by the carrier cutting unit 7, the carrier transport chuck 8 as described above chucks the second coupling section 134 located on the right side of the terminal connection section 132B and the terminal connection section 132 continuous with the right side of the second coupling section 134 (herein, the second coupling section 134 and the terminal connection section 132 continuous with the right side of the second coupling section 134 can be collectively referred to as "carrier chuck section 136"), as shown in FIG. 4, and the carrier chuck section 136 is moved from the first transport position to the second transport position while being chucked by the pair of chuck units 81, 82. By doing so, the terminal 13B is positioned between the right anvil 94 and the right crimper 92, as shown in FIG. 5. Then, the carrier 131 is fed to the right by the terminal feed unit, and the terminal 13A is positioned between the left anvil 94 and the left crimper 92. Then, each terminal 13A, 13B is crimp-connected to the electric wire 11 by the crimp mechanism 9, and then, after each terminal 13A, 13B is separated from each terminal connection section 132A, 132B using the terminal cutting unit, the carrier chuck section 136 is released from the chucking by the pair of chuck units 81, 82, thereby the carrier chuck section 136 is dropped together with the terminal connection section 132B (132) continuous therewith.

The crimp mechanism 9 includes a frame not shown that supports the ram in a manner capable of moving the ram up and down, the crimper 92 fixed to the ram, and the pair of anvils 94, 94 arranged opposed to the crimper 92 and arranged in an anvil support table 93 located on the lower side.

The crimper 92 is provided with a curved face 920 that swages and fastens the pair of conductor fasten pieces 151, 151 and the pair of cover fasten pieces 152, 152 of each terminal 13A, 13B. In this embodiment, the curved faces 920 are provided in a pair and arranged side by side along the right-left direction. The pair of curved faces 920, 920 is configured to simultaneously (substantially simultaneously) swaging and fastening the pair of conductor fasten pieces 151 and the pair of cover fasten pieces 152 of the pair of terminals 13A, 13B, The pair of anvils 94, 94 is provided below the pair of curved faces 920, 920 of the crimper 92, respectively. Each anvil 94 is provided with a placement face 94A for placing the base section 150 of the electric wire connection section 15 of each terminal 13A, 13B. The crimper 92 and the pair of anvils 94, 94 constitute crimp dies.

In the terminal crimping device 1 as described above, the drive unit is driven according to an instruction from the control unit. In the following, an operation of the terminal crimping device 1 is explained with reference to FIG. 1 to FIG. 11.

Firstly, as shown in FIG. 1 and FIG. 2, the carrier cutting unit 7 is positioned to the first cut position, and the first coupling section 133 is positioned between the pair of opposing walls 71, 72. The carrier transport chuck 8 is positioned at the first transport position, and the carrier chuck section 136 is arranged on the upper face 82A of the lower chuck unit 82 between the pair of chuck units 81, 82. Then, according to an instruction from the control unit, the upper chuck unit 81 is moved downward to chuck the carrier chuck section 136.

Next, as shown in FIG. 3, according to an instruction from the control unit, the carrier cutting unit 7 is moved from the first cut position to the second cut position, thereby cutting the first coupling section 133. Then, as shown in FIG. 4, the control unit makes the carrier cutting unit 7 to move from the second cut position to the first cut position, and, as shown in FIG. 5, makes the carrier transport chuck 8 to return from the first transport position to the second transport position. At this time, since the carrier chuck section 136 is chucked by the carrier transport chuck 8, the terminal 13B and the terminal connection section 132B are moved to the right together with the carrier chuck section 136. Thus, the terminal 13B is placed onto the placement face 94A of the anvil 94 located on the right side.

Figure 6:
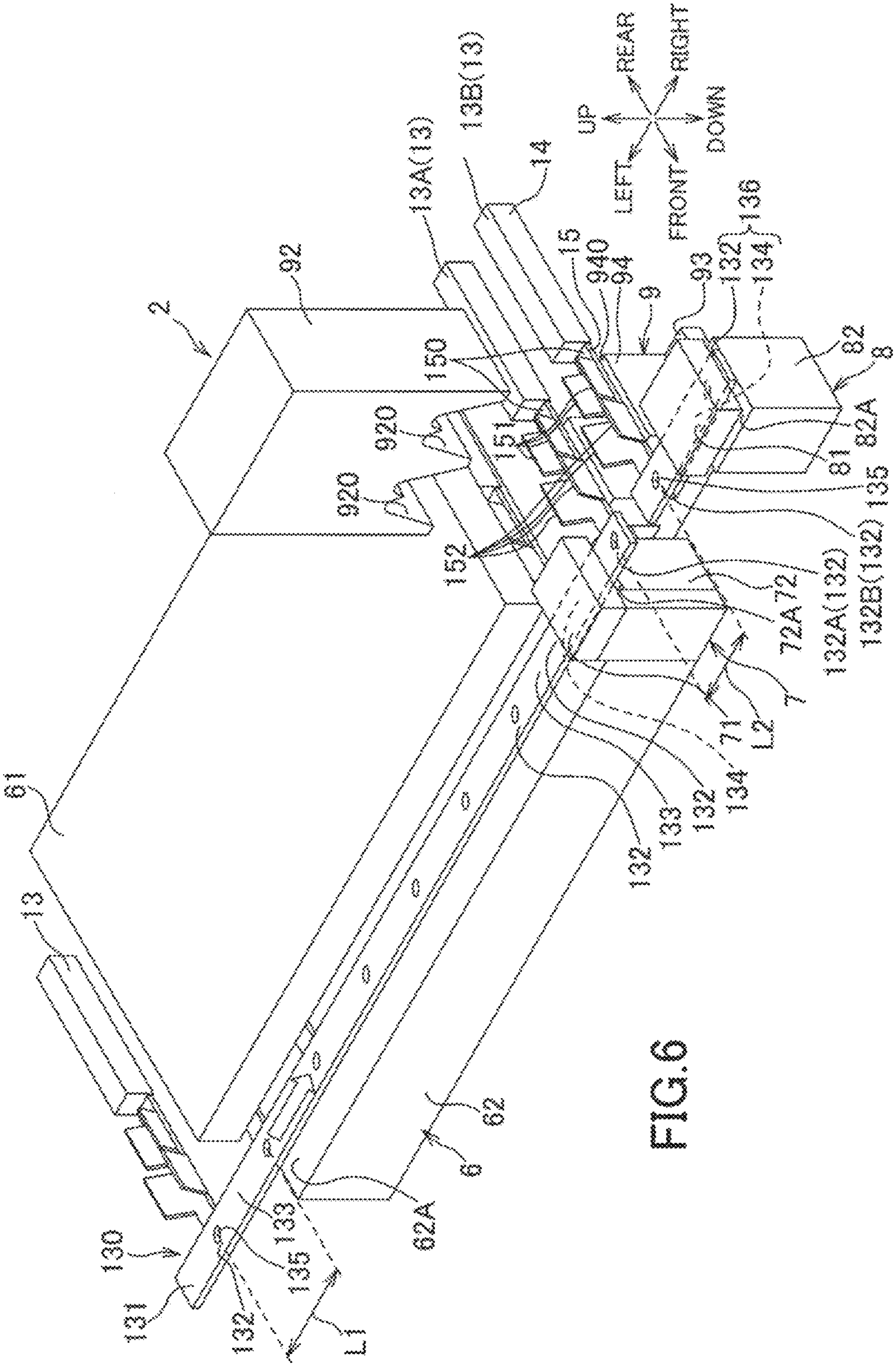
FIG. 6 is a perspective view of the terminal crimping device illustrating an operation state after FIG. 5.
Figure 7:
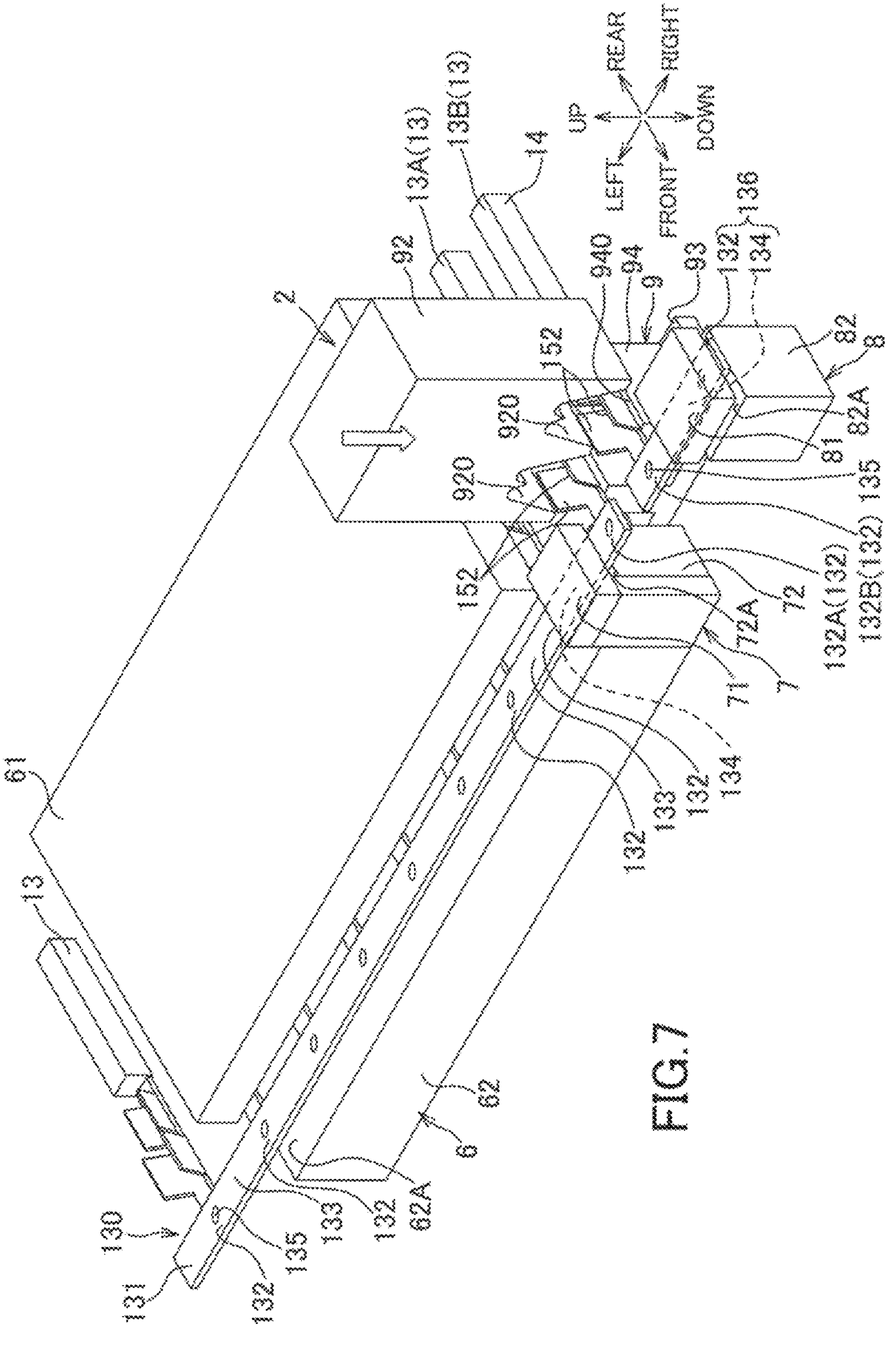
FIG. 7 is a perspective view of the terminal crimping device illustrating an operation state after FIG. 6.
Figure 8:
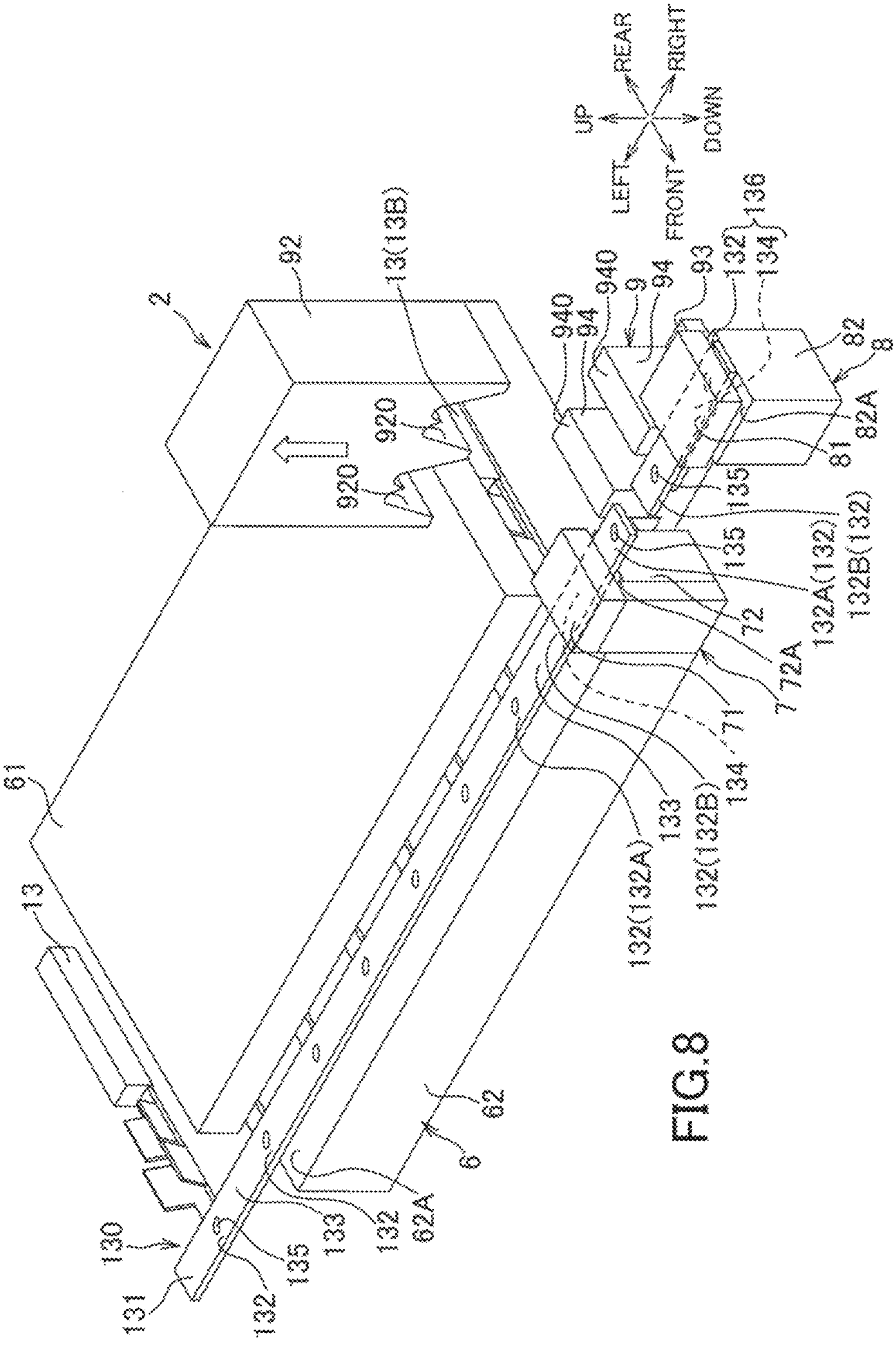
FIG. 8 is a perspective view of the terminal crimping device illustrating an operation state after FIG. 7.

Then, the control unit operates the terminal feed unit to feed the carrier 131 that is continuous with the terminal 13A to the right. By doing so, the terminal 13A (the one) is moved closer to the terminal 13B (the another), and the separation distance between the terminal 13A and the terminal 13B becomes the predetermined distance L2. That is, the pair of terminals 13A, 13B is positioned. The second coupling section 134 on the left side of the terminal 13A is positioned between the pair of opposing walls 71, 72 of the carrier cutting unit 7, and, as shown in FIG. 6, the terminal 13A is placed onto the placement face 94A of the anvil 94 located on the left side. Then, the electric wires 11 having the conductor sections 111 exposed by removing the covers are placed onto the base sections 150 of the electric wire connection sections 15 of the terminals 13A, 13B, and the ram is moved downward to move the crimper 92 downward, as shown in FIG. 7. Then, by using the curved faces 920 of the crimper 92, the pair of conductor fasten pieces 151 of the respective terminals 13A, 13B is swaged and fastened and connected to the conductor sections 111 of the electric wires 11, and the pair of cover fasten pieces 152 is swaged and fastened and connected to the covers 110 of the electric wires 11. By doing so, the pair of terminals 13A, 13B is crimp-connected to the respective electric wires 11. Then, the ram is moved upward. With this, the crimper 92 is moved upward. Then, the pair of terminals 13A, 13B is separated from the respective terminal connection sections 132A, 132B using the terminal cutting unit, providing the completed multi-conductor cable 10.

Figure 9:
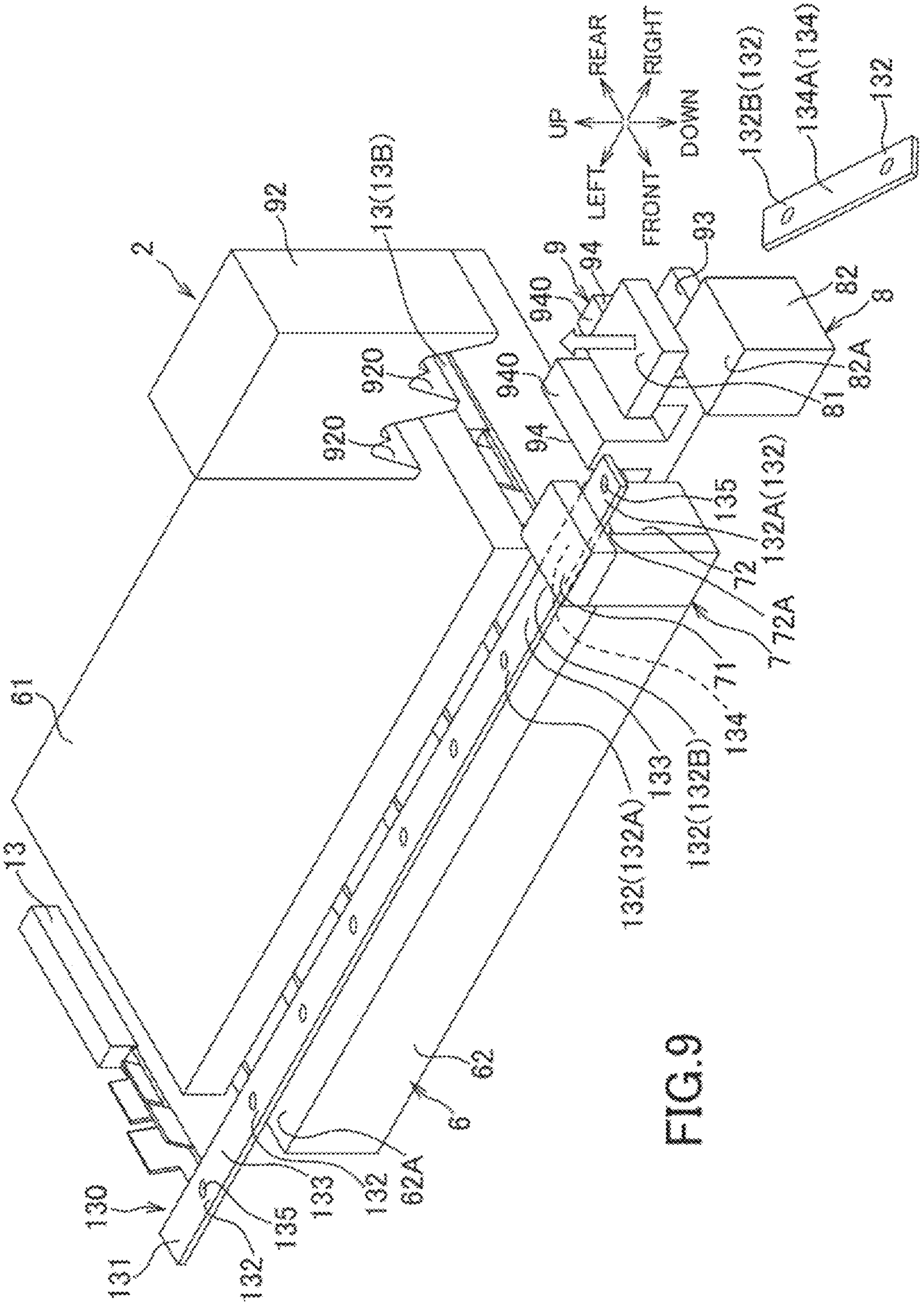
FIG. 9 is a perspective view of the terminal crimping device illustrating an operation state after FIG. 8.

Finally, as shown in FIG. 9, the upper chuck unit 81 of the carrier transport chuck 8 is moved upward, and the chucking by the pair of chuck units 81, 82 is released, thereby dropping the carrier chuck section 136 and the terminal connection section 132B (132) that is continuous with the carrier chuck section 136.

Figure 10:
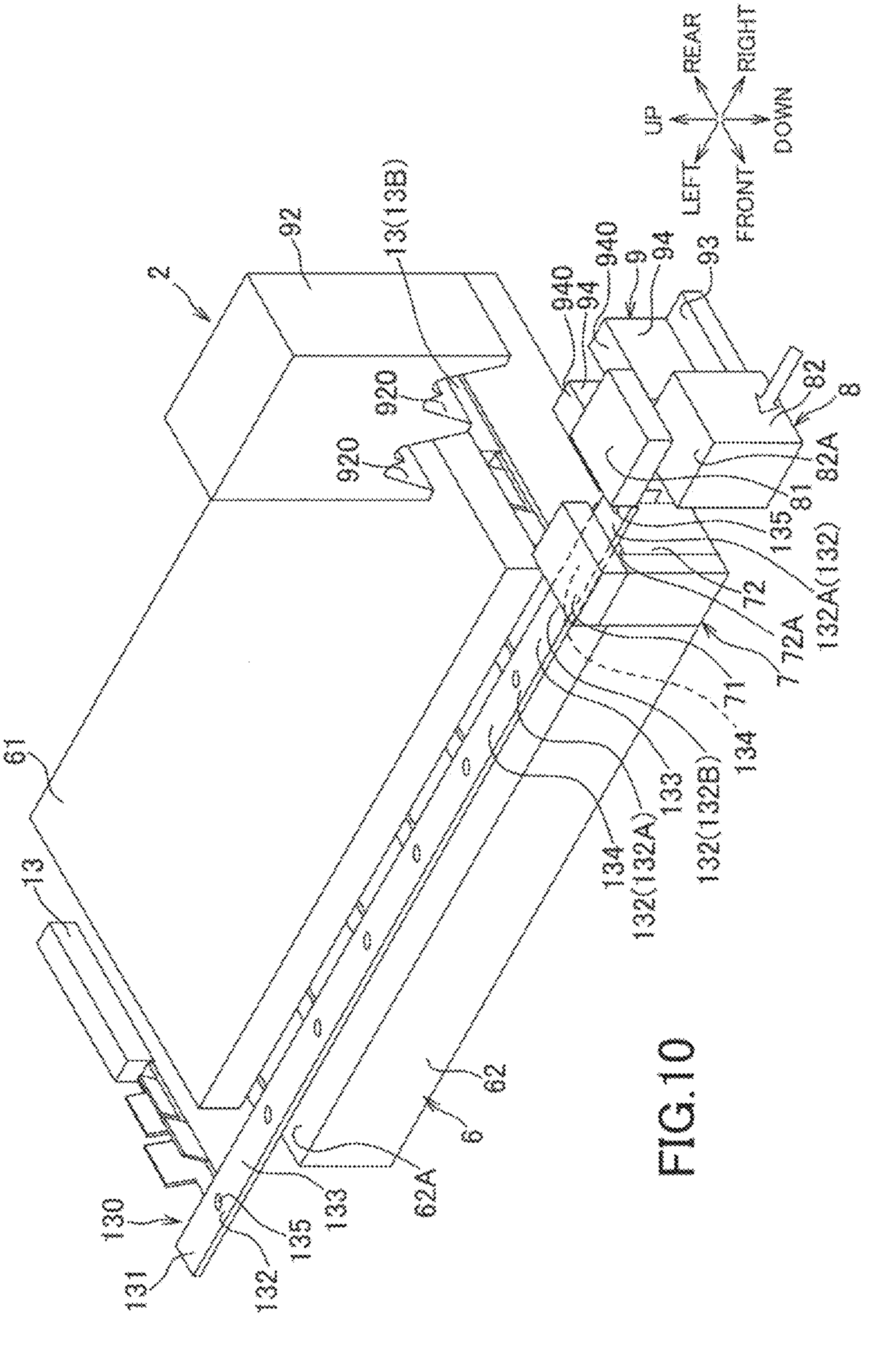
FIG. 10 is a perspective view of the terminal crimping device illustrating an operation state after FIG. 9.
Figure 11:
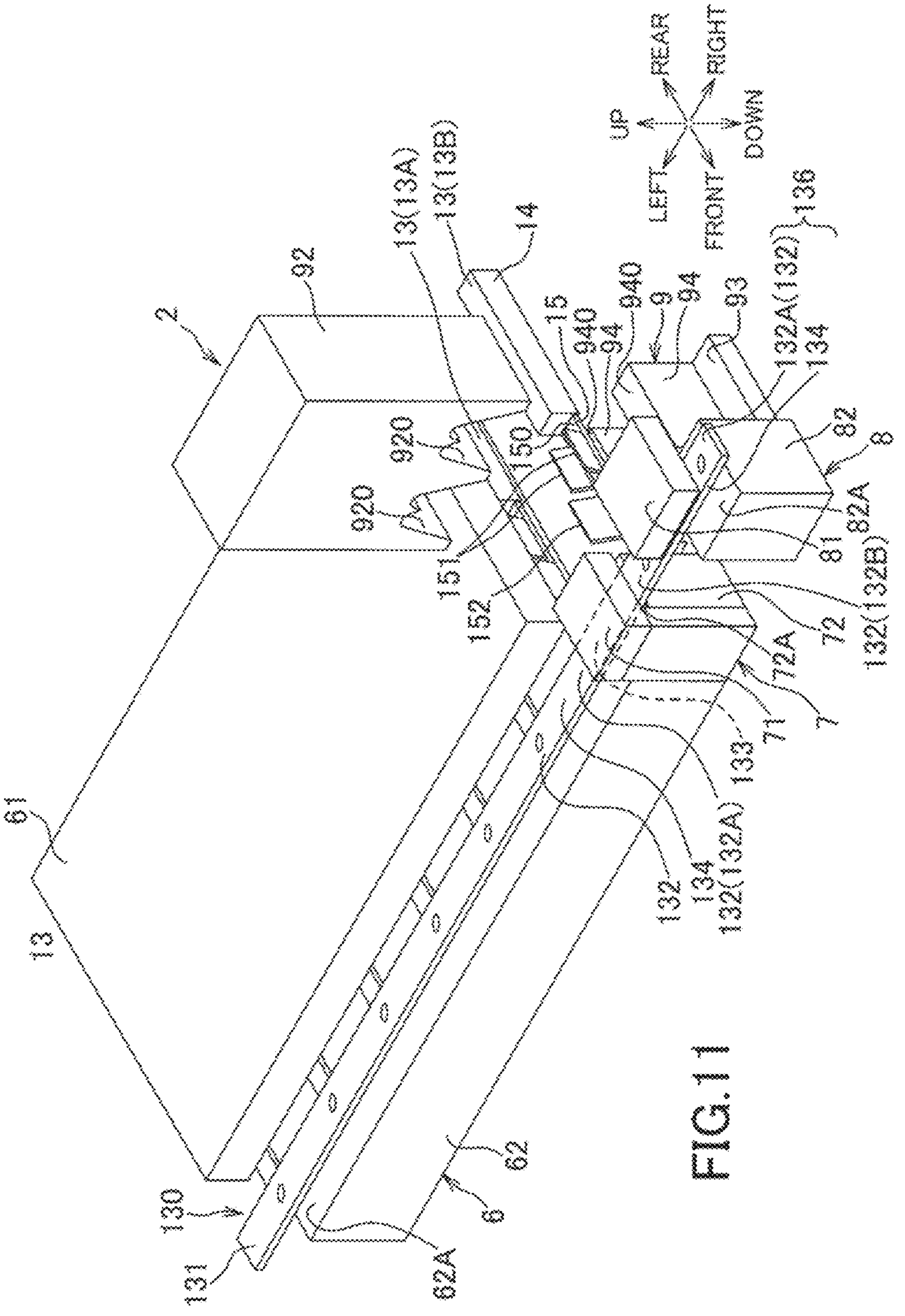
FIG. 11 is a perspective view of the terminal crimping device illustrating an operation state after FIG. 10.

Then, according to an instruction from the control unit, the carrier transport chuck 8 is moved from the second transport position to the first transport position, as shown in FIG. 10. Subsequently, as shown in FIG. 11, the carrier 131 is fed to the right by the terminal feed unit. As shown in FIG. 1, the first coupling section 133 is positioned between the pair of opposing walls 71, 72 of the carrier cutting unit 7. The second coupling section 134 and the terminal connection section 132A (132) that is continuous therewith are positioned between the pair of chuck units 81, 82 of the carrier transport chuck 8. In a manner as described above, a series of operations of the terminal crimping device 1 is completed. These operations will be repeated.

The embodiment described above includes the carrier cutting unit (carrier cutting means) configured to cut the first coupling section 133 (coupling section) of the carrier 131, the terminal positioning means configured to position the one terminal (the terminal 13A) of the pair of terminals 13A, 13B such that the one terminal is located close to the another terminal (the terminal 13B) of the pair of terminals 13A, 13B, and the crimper 92 and the anvils 94 (crimp dies) provided as a pair and configured to crimp-connect the respective terminals 13A, 13B to the electric wires 11. Thus, by cutting the first coupling section 133, the another terminal (the terminal 13B) of the pair of terminals 13A, 13B is separated from the one terminal (the terminal 13A) of the pair of terminals 13A, 13B, and thus they can be positioned close to each other using the terminal positioning means, thereby stabilizing the posture of the respective terminals 13A, 13B during crimping. Hence, the crimp position of the respective terminals 13A, 13B with respect to the electric wires 11 can be fixed, so tip ends of the respective electrical contact sections 14 of the respective terminals 13A, 13B can be aligned, for example. Consequently, the machining quality can be improved.

Furthermore, the terminal positioning means includes the terminal feed unit (terminal feed means) configured to feed the carrier 131 from the one (terminal 13A) to the another (terminal 13B), and the carrier cutting unit 7 (carrier cutting means) includes the pair of opposing walls 71, 72 (support unit) that supports the carrier 131 in a manner capable of moving the carrier 131 from the one (terminal 13A) towards the another (terminal 13B), and the pair of blades arranged side by side along the direction of the opposing walls 71,72 from the one (terminal 13A) towards the another (terminal 13B) (i.e., the right direction) and configured to cut and cut out the first coupling section 133 (coupling section). Thus, since the terminal crimping device 1 includes the terminal feed unit and the carrier cutting unit 7 (carrier cutting means) having the pair of opposing walls 71, 72 and the pair of blades, the one terminal 13A can be fed towards the another terminal 13B after the first coupling section 133 (coupling section) between the pair of terminals 13A, 13B has been cut, thereby reducing the distance between the pair of terminals 13A, 13B. Consequently, the separation distance between the pair of terminals 13A, 13B becomes the dimension L2.

Here, for example when the pair of terminals 13A, 13B is crimp-connected to the pair of electric wires 11 in a state where the distance between the terminals 13A, 13B corresponds to the dimension L1 between the terminals 13A, 13B having the first coupling section 133 that is not cut, then the pair of electric wires 11 may be bent into a fork-like shape to make the distance between the pair of electric wires 11 to be the dimension L2. However, this may provide a habit of bending to the pair of electric wires 11 and may affect the high-frequency characteristics of each electric wire 11. Thus, in this embodiment, the pair of terminals 13A, 13B is crimp-connected in a state where the pair of terminals 13A, 13B is positioned in advance such that the separation distance between the pair of terminals 13A, 13B is set to the dimension L2. Consequently, it is possible to prevent from affecting the high frequency characteristics of each electric wire 11.

<Terminal Crimping Method>

Figure 12C:
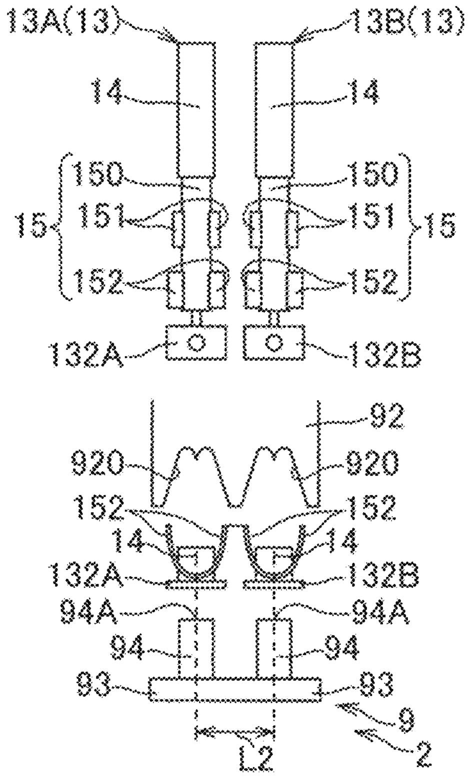
FIG. 12C is a diagram showing an operation state after FIG. 12B.
Figure 12D:
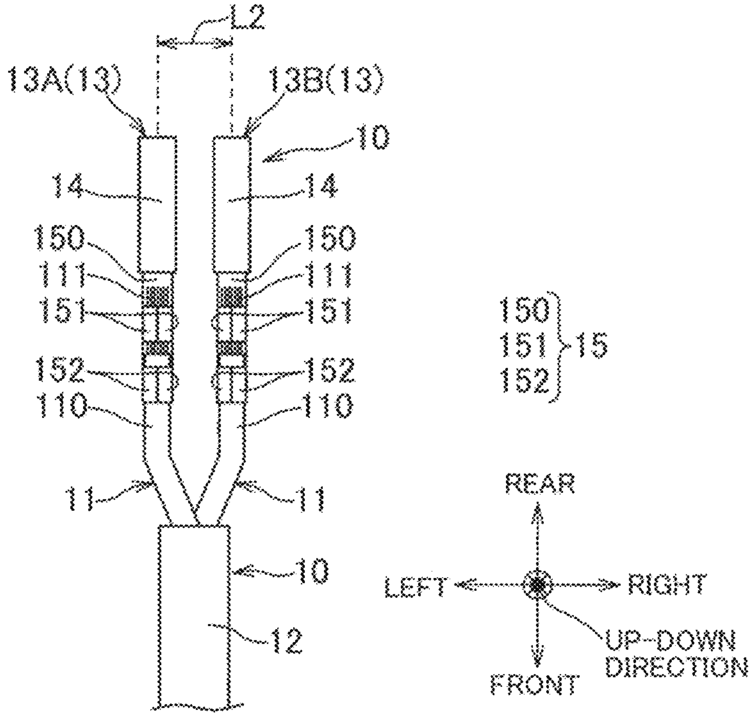
FIG. 12D is a diagram showing an operation state after FIG. 12C and is a plan view showing the multi-conductor cable.

Next, a terminal crimping method using the terminal crimping device 1 will be explained with reference to FIG. 12A to FIG. 12D. FIG. 12A to FIG. 12D schematically illustrate the procedure for producing the multi-conductor cable 10. Specifically, FIG. 12A is a diagram showing how the pair of terminals 13A, 13B is horizontally guided by the terminal guide 6 from the terminal reel (not shown) to the location where the anvil 94 is, FIG. 12B is a diagram showing how the first coupling section 133 is cut, FIG. 12C is a diagram showing the state where the one terminal (terminal 13A) of the pair of terminals 13A, 13B is positioned such that the one terminal is located close to the another terminal (terminal 13B) of the pair of terminals 13A, 13B, and FIG. 12D is a plan view showing the multi-conductor cable 10 in a completed state.

Firstly, as shown in FIG. 12A, the control unit drives the drive unit and feeds the carrier 131 to the right using the terminal feed unit. The pair of terminals 13A, 13B is drawn out from the terminal reel and is horizontally guided by the terminal guide 6 to position the first coupling section 133 between the pair of opposing walls 71, 72 of the carrier cutting unit 7. As shown in FIG. 12B, the carrier cutting unit 7 is moved from the first cut position to the second cut position, thereby cutting the first coupling section 133 (corresponds to a carrier cutting step). The first coupling section 133 is cut out. Then, as shown in FIG. 12C, the one terminal (terminal 13A) of the pair of terminals 13A, 13B is moved closer to the another terminal (terminal 13B) of the pair of terminals 13A, 13B by the terminal feed unit. The pair of terminals 13A, 13B is positioned (corresponds to a terminal positioning step). At this time, each of the pair of terminals 13A, 13B is placed onto each placement face 94A of the pair of anvils 94, 94. Then, the crimper 92 is moved downward to crimp-connect the respective terminals 13A, 13B to the respective electric wires 11 (corresponds to a terminal crimp step). The front sides of the pair of electric wires 11 are covered in a lump with the insulation sheath 12 such that the rear ends of the pair of electric wires 11 are exposed. In a manner as described above, the multi-conductor cable 10 is completed as shown in FIG. 12D.

The terminal crimping method described above includes the carrier cutting step of cutting the first coupling section 133 (coupling section) that is located between the pair of terminals 13A, 13B and that couples the pair of terminals 13A, 13B, the terminal positioning step of positioning the one terminal (terminal 13A) of the pair of terminals 13A, 13B that has been separated by cutting in the carrier cutting step, such that the one terminal (terminal 13A) is located close to the another terminal (terminal 13B) of the pair of terminals 13A, 13B, and the terminal crimping step of crimp-connecting each terminal 13A, 13B that has been positioned in the terminal positioning step to the electric wire 11. By cutting the first coupling section 133 as described above, the another terminal (terminal 13B) of the pair of terminals 13A, 13B is separated from the one terminal (terminal 13A) of the pair of terminals 13A, 13B, so they can be arranged close to each other in the terminal positioning step, thereby stabilizing the posture of the terminals during crimping. Thus, the crimp position of each terminal 13A, 13B with respect to the electric wire 11 can be fixed, so the tip ends of the respective electrical contact sections 14 of the respective terminals 13A, 13B can be aligned, for example. Consequently, the machining quality can be improved.

The present invention is not limited to the embodiment described above and may include other configurations that can achieve the object of the present invention, and a modified example as described below is also included in the present invention.

In the embodiment described above, the carrier cutting unit 7 (carrier cutting means) includes the pair of opposing walls 71, 72 and the pair of blades configured to cut and cut out the first coupling section 133, however, the present invention is not limited to this. The carrier cutting means may be configured to cut the first coupling section 133 linearly by only one blade. In this case, when moving the terminal 13A (the one terminal) of the pair of terminals 13A, 13B closer to the terminal 13B (the another terminal), one of the divided first coupling sections (coupling sections) may be placed onto the another one of the divided first coupling sections to make the distance between the pair of terminals 13A, 13B set to the predetermined dimension L2.

Although preferred configuration and method for implementing the present invention have been disclose above, the present invention is not limited to these. That is, although the present invention is specifically illustrated and explained in association with the specific embodiment, a person skilled in the art can make various modifications to the embodiment described above regarding shape, material, number and other details without departing from the technical idea and the object of the present invention. Hence, the descriptions disclosed above that specify the shape, material and such are for illustrative purpose only to help understanding the present invention and are not intended to limit the present invention, thus the description of name of a member not including a part or an entire of such specific description of shape, material and such is also included in the present invention.

LIST OF REFERENCE SIGNS

1 terminal crimping device
7 carrier cutting unit (carrier cutting means)

11 electric wire
13A one terminal of pair of terminals
13B another terminal of pair of terminals
71, 72 pair of opposing walls (support unit)
94 anvil (crimp die)
92 crimper (crimp die)
131 carrier
132 terminal connection section
133 first coupling section (coupling section)

The invention claimed is:

1. A terminal crimping device configured to crimp-connect, to an electric wire, each of a pair of adjacent terminals of a plurality of terminals coupled to each other by a carrier, the carrier comprising a terminal connection section connected to each of the terminals and a coupling section coupling adjacent terminal connection sections, the terminal crimping device comprising:

a carrier cutting unit configured to cut the coupling section, a terminal positioning unit configured to position one terminal of the pair of terminals such that the one terminal is located close to another terminal of the pair of terminals, and crimp dies configured as a pair to crimp-connect each of the terminals to the electric wire, wherein the terminal positioning unit includes a terminal feed unit configured to feed the carrier from the one towards the another, the carrier cutting unit includes a support unit that supports the carrier in a manner capable of moving the carrier from the one towards the another, and a pair of blades arranged side by side at the support unit along a direction from the one towards the another and configured to cut the coupling section to cut out at least a part of the coupling section.

* * * * *